July 11, 1944.   A. V. DE FOREST ET AL   2,353,550
PERMANENT MAGNET
Original Filed May 18, 1939    2 Sheets-Sheet 1
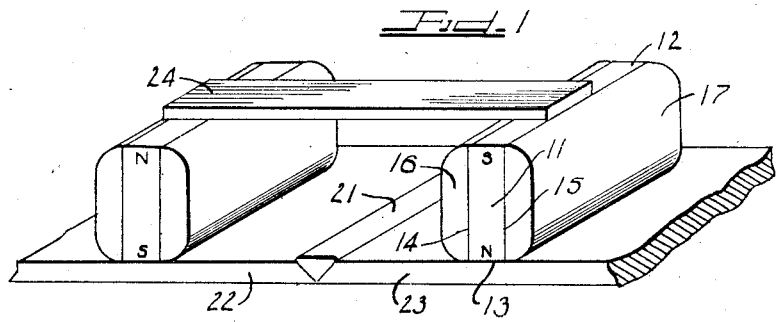
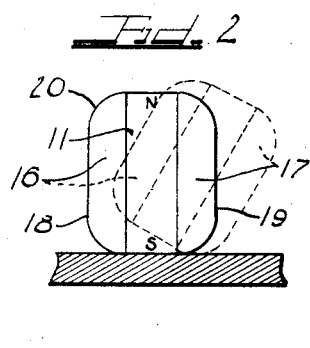
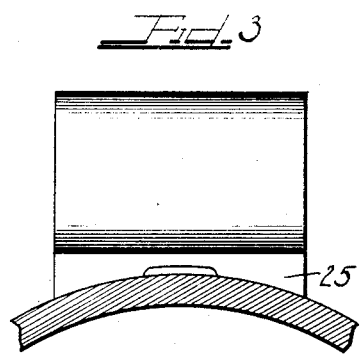
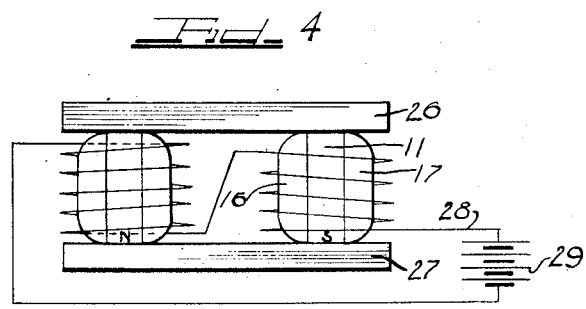
Inventors.
ALFRED V. DE FOREST
FOSTER B. DOANE July 11, 1944.  A. V. DE FOREST ET AL  2,353,550
PERMANENT MAGNET
Original Filed May 18, 1939   2 Sheets-Sheet 2

Inventors
ALFRED V. DE FOREST
FOSTER B. DOANE

Patented July 11, 1944

2,353,550

UNITED STATES PATENT OFFICE 2,353,550

PERMANENT MAGNET

Alfred V. de Forest, Marlboro, N. H., and Foster B. Doane, Wilmette, Ill., assignors to Magnaflux Corporation, Chicago, Ill., a corporation of Delaware Original application May 18, 1939, Serial No. 274,318. Divided and this application September 10, 1941, Serial No. 410,234

1 Claim. (Cl. 175—367)

The present invention relates in general to an improved permanent magnet construction, and is particularly concerned with the construction of a permanent magnet in such a manner that it may be utilized for the magnetic testing of objects, the magnet being so arranged that it may be easily removed from the object at the conclusion of the testing operation.

This application is a division of our application Serial No. 274,318, entitled "Permanent magnet and method of using same," filed May 18, 1939.

Heretofore, in the inspection of welds and other parts for defects, it has been the usual practice to test the weld or part by subjecting the surface of the weld or part to a magnetic field and then apply finely divided particles of paramagnetic material to the surface of the weld or part for disclosing any defects which may be present therein. This manner of testing is generally well known in the art.

For producing the requisite magnetic field, electromagnets have been generally utilized. The requirement of electrical connections for energizing the electromagnets has in many cases constituted a nuisance, and frequently requires the installation of costly special generating equipment and control apparatus therefor to produce the required current.

Having in mind the inherent disadvantages attending the use of electromagnets for this type of testing, it is proposed in the present invention to provide improved permanent magnets constructed of a material such as "Alnico" which is an alloy of aluminum, nickel, cobalt and iron, these magnets being very powerful. These permanent magnets are so constructed as to facilitate their being utilized in lieu of electromagnets for carrying out the testing operation as stated above.

One difficulty attending the use of powerful permant magnets for such purpose has been that they cannot be deenergized as in the case of electromagnets to enable their being easily removed from the part being tested. In the present invention, however, this difficulty has been overcome by the provision of novel means whereby the attractive magnetic forces between the poles of the magnet and the part being tested may be so altered as to facilitate manually removing the permanent magnets from the part being tested.

We have discovered that this may be accomplished in several different ways. For example, the magnets may have their inactive side portions fitted with non-magnetic pieces of any suitable material such as wood, plastic, semi-hard rubber composition and the like. These side pieces are preferably provided with rolling surfaces adjacent the magnet pole faces, which enable rolling of the magnet off its pole-contact surface onto the non-magnetic side pieces, whereby the magnet may be easily lifted from the object or part being tested.

Removal of the permanent magnets may be facilitated also by constructing the magnet poles so that a decrease in the contact area of the pole face with the object takes place as the magnet is moved, thus increasing the reluctance of the magnetic path between the magnet and the object being tested, whereby the magnet may be lifted to remove it from the test piece.

In carrying out the above invention, it is a primary object to provide an improved magnetic testing method embodying the use of permanent magnets which are so constructed as to enable the magnets to be manually removed from the test piece.

Another object of the invention is to provide, as a new article of manufacture, a permanent magnet of novel construction.

A still further object is to provide an improved permanent magnet of such construction that the magnetic attractive forces, when it is applied to a metallic part, may be overcome by a rolling movement of the magnet and thus facilitate its manual removal from the metallic part.

It is also an object to provide improved means for protecting permanent magnets against damage, particularly where these magnets are constructed of brittle materials.

Other objects and features of the invention will more fully appear from the following detailed description taken in connection with the accompanying drawings, which illustrate several embodiments thereof, and in which:

Figure 1 is an isometric view showing the manner in which magnets embodying our novel construction may be utilized for the testing of welds and other parts, the magnets being applied to a flat surface;

Figure 2 is an elevational view of one of the magnets, and illustrating the manner in which it may be tilted or rolled to facilitate its removal from the test piece;

Figure 3 is a side view of the magnet having a special piece to enable the magnet to be applied to a curved surface;

Figure 4 is a view schematically illustrating one method by which the above permanent magnets may be remagnetized;

As shown on the drawings:

Figure 5:
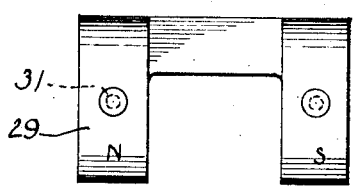
Figure 5 is an elevational view of a modified permanent magnet construction embodying the features of the present invention, this magnet being of horseshoe or U-shape.

Referring to Figures 1 and 2, there is shown one form of construction for a permanent magnet testing device embodying the features of the present invention.

This magnet construction comprises an elongate bar 11 of magnetizable material. The bar may be constructed of any suitable material, and for this purpose the commercially known alloy "Alnico" has been found to be very satisfactory. Magnets constructed of this material are capable of producing very high magnetic fields and have high coercive force.

While the bar 11 may be constructed of various sizes, a suitable size for use in the testing of welds and structural parts would be approximately one inch thick by five inches wide and six inches long. The bar, in this case, is magnetized so that its edge faces 12 and 13 will define the pole faces or active sides of the magnet, and will have opposite polarities. That is, one of the faces would be south pole and the other face the north pole of the magnet. The poles of the magnet may be marked in any suitable manner, as by painting the ends of the magnets a distinctive color, or by placing the letters "N" and "S" on the corresponding magnet poles.

The use of permanent magnets instead of electromagnets for testing purposes has heretofore been impracticable for the reason that suitable magnets had to be constructed of materials which were extremely brittle and easily broken during use. Moreover, since the permanent magnets could not be de-energized in the manner that electromagnets could be de-energized so that they could be easily removed from the material being tested, the attractive forces in the permanent magnet were so great that manual removal of the magnet was very difficult.

In the magnets of the present invention, these difficulties have been overcome in a novel manner. As will be noted, the bars 11 have their inactive side faces 14 and 15 provided with protective pieces 16 and 17 which may be constructed of any suitable non-magnetic material such as wood, plastic, or a semi-hard rubber compound. These pieces may be secured to the magnet bar in any suitable manner. Such materials as plastic, wood, etc., may be secured as by suitable rivets, and in the case of rubber compositions, the pieces may be vulcanized directly to the bar.

Since the protective pieces are extended to the periphery of the bar, these pieces act as shields for protecting the bar material against damage. As shown in Figure 2, the protective pieces may have their exposed surfaces generally formed flat as shown at 18 and 19, these surfaces alternating with the pole faces 12 and 13 to form right angularly disposed magnetized and non-magnetized areas.

In order to facilitate removal of the magnetic device from a flat surface to which it has been applied, the exposed corners of the protective pieces are rounded as shown at 20, this rounded corner being terminated flush with the associated pole face surface so as to form a rolling fulcrum adjacent the pole face.

As shown in dotted lines in Figure 2, the magnetic device may be rolled from a position with its pole face contacting a metal surface to a position in which one of the protective pieces is brought into contact with the metallic surface. It will be noted that this rolling movement of the magnet imparts a translatory movement to the adjacent pole face of the magnet and moves it away from the metallic surface with which it was previously in contact. Simultaneously with this movement, the protective side piece is inserted between the magnet and the metallic surface so that the attractive forces between the magnet and the metallic surface are materially decreased to such extent as to enable manual raising of the magnet away from the metallic surface. It will be apparent that by positioning the fulcra as shown in Figure 2, a mechanical lever construction results which aids materially in rolling or tilting of the magnet during the removal process.

Figure 1 discloses the manner in which these permanent magnet devices may be utilized for the magnetic testing of structural parts including a welded joint 21 between flat plate members 22 and 23.

In carrying out the test, one of the magnetic devices is placed on each side of the weld, one of these devices having its north pole engaging the plate structure and the other device its south pole engaging the adjacent plate structure. With the magnets so disposed, magnetic flux will be set up traversing the plates and weld between the magnetic devices. Finely divided paramagnetic material is then applied to the structure under test between the magnetic devices for indicating defects in the same manner as when electromagnets are utilized.

Should it be desired to have the magnetic flux traverse the weld at an angle, this may be easily accomplished by placing one of the magnetic devices in a position advanced longitudinally along the weld with reference to the other device.

Usually the test may be conducted as just described, however, there may be instances where a closed magnetic path is desired including the permanent magnet. Under such circumstances, the uppermost poles of the magnets may be interconnected by a suitable metallic strip or keeper 24. This keeper serves the added purpose of aiding in removing the magnetic devices, as the keeper may be grasped and by pushing it longitudinally, cause the magnetic devices to roll onto their non-magnetic surfaces, whereupon the keeper and magnet may be readily removed.

The use of permanent magnets, aside from their inherent advantages of not requiring energization from an electric source, has the added advantage of the resulting safety when utilizing them in connection with tests on vertical or overhead structures. Where the present electromagnets are used some sort of safety arrangement is necessary to protect the workmen against the possibility of the electromagnets becoming detached due to interruption of the magnetizing current.

Permanent magnets have the further advantage of flexibility in use, as for example, the permanent magnets could be conveniently used on structural welding in buildings and ships where a fillet weld exists between two surfaces at right angles.

In cases where the magnets are to be utilized on curved surfaces, the magnets are readily adapted for such use by providing suitable pole-piece adapters 25 as shown in Figure 3, the pole-piece adapter being provided with a work contact surface of suitable curvature.

When the magnets are not being used for testing purposes, they may be readily stored by placing them between two keepers so that each keeper interconnects unlike poles of the magnets. Naturally, such powerful magnets would be exceedingly difficult to separate from their keepers, but our improved construction enables easy separation which may be accomplished merely by moving the upper and lower keepers in opposite directions to cause the magnet devices to roll onto their non-magnetic surfaces.

It will be appreciated that these magnetic devices will have to be remagnetized occasionally, since they will, to some extent, lose their magnetic properties over a period of time and use. The devices may be readily remagnetized by providing a closed magnetic circuit by means of the metallic strips 26 and 27, as shown in Figure 4. A heavy cable is then wrapped in opposite directions about the devices, about five turns being provided around each device in the proper direction to magnetize the devices with the desired polarity. This cable, as indicated at 28, is then connected at its ends to a suitable storage battery 29. In practice, it may require as much as two thousand amperes in the magnetizing circuit for remagnetizing the magnets.

For certain types of testing, a horseshoe type of magnet is desirable. In order to embody the same features as previously described in a horseshoe type of magnet device, the magnet bar is constructed of horseshoe or U-shape, as shown in Figure 5. Although we have shown the magnet of this type as being formed from a continuous bar, it will be appreciated that the bridging portion of the magnet may be constructed of a separate piece of low-carbon steel to which separate bar magnets may be attached at each end.

In the construction shown in Figure 5, the legs of the magnet terminate at their ends in opposite poles, that is, a north pole and a south pole.

Figure 6:
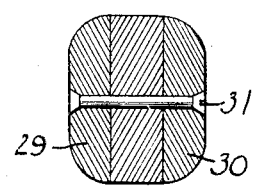
Figure 6 is a section taken through one end of the magnet of Figure 5, showing the manner in which the protective side pieces may be secured.

Each leg of the magnet, as shown in Figure 6, is provided with longitudinally extending protective pieces 29 and 30 of similar construction to the pieces previously described. These pieces are shown as being, in this instance, connected to the associated leg of the magnet bar by means of a suitable rivet 31 which extends through the protective pieces and the bar leg to which the pieces are secured. This type of magnetic device may be utilized in the same manner as the separate devices previously described for carrying out the testing operation. In this case, however, it is only necessary to use one magnet instead of two as in the previous case.

Figure 7:
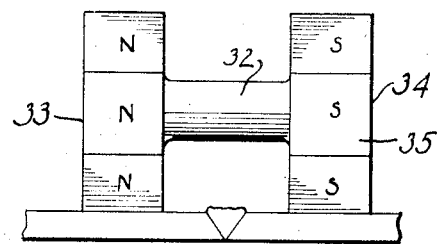
Figure 7 is another modified construction, the magnet being constructed to have a generally dumb-bell shape.
Figure 8:
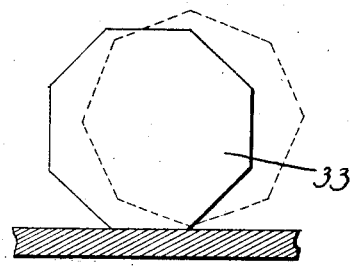
Figure 8 is an end view of the same.

Referring to Figures 7 and 8, there is shown an alternate form of construction, wherein the magnet device is of generally dumb-bell shape, these devices not having the protective pieces.

In this form of construction, there is provided an elongate axle 32 having its ends associated with wheel portions 33 and 34 of generally polygonal shape, as shown in Figure 8. Each of these wheels is provided around its periphery with angularly disposed face portions 35 which define pole face contacting surfaces.

This form of construction may have the axle portion 32 integrally formed with the wheel portions, or the wheel portions may be separately formed and secured to a separate axle of low-carbon steel or other suitable material. In this latter case, the wheel portions would be constructed of a material with high coercive force, and the wheel portions would be separately magnetized to have their peripheries with north and south polar portions respectively. Where the magnet is of unitary construction, one wheel would be magnetized north and the other south.

In this arrangement, the device would be used in a similar manner to the horse-shoe-type magnet, and in testing welds, would be disposed with one wheel portion on one side of the weld and the other wheel portion on the other side of the weld.

In this form of construction, removal of the magnet from the surface to which it has been applied is accomplished by rolling the device on its wheel portions, as shown in Figure 8. Rolling movement of the device brings corner portions between adjacent pole faces into contact with the surface of the work or test piece, and results in the adjacent pole faces being disposed at an angle to said surface. It will be apparent that this action materially decreases the contact area between the magnet and the material under test, and increases the reluctance in the magnetic flow path between the magnet and the work piece to such an extent that the attractive forces are materially decreased so that the magnet may be readily removed by lifting it away from the test piece.

Figure 9:
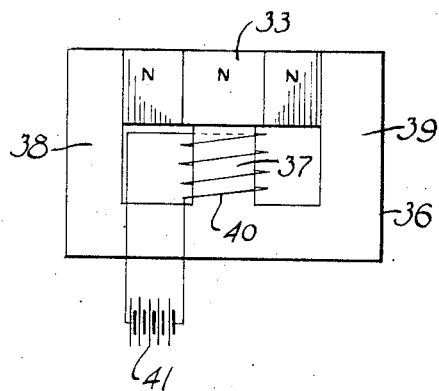
Figure 9 is a view schematically illustrating one method of remagnetizing the poles of the magnet as shown in Figure 7.
Figure 10:
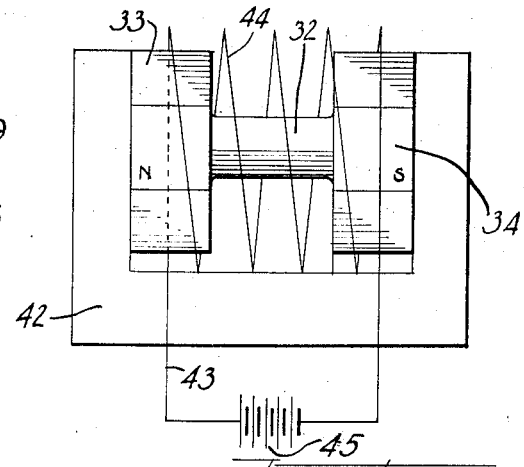
Figure 10 illustrates schematically how the entire magnetic device as a unit may be magnetized.

In Figure 9, is shown an arrangement for remagnetizing the dumb-bell type of magnetic device having the separate wheel portions. In this case each wheel portion is separately magnetized by means of a three-legged core 36 which is disposed with its middle leg 37 at the center of the wheel portion and its outermost legs 38 and 39 in engagement with diametrically opposed pole faces of the wheel portion. By winding a cable around the middle leg of the core to form a coil 40, and connecting this coil to a suitable battery 41, magnetic flux may be caused to flow radially in the wheel portion. By having the current and coil winding in the proper directions, each wheel portion may be magnetized with its pole faces north or south as desired.

Where the wheel portions and axle are integrally formed, or where the wheel portions form pole pieces, the entire unit may be magnetized by inserting in a two-legged core 42, as shown in Figure 10, with the core legs respectively engaging the ends of the unit. A cable 43 may then be coiled around the device as shown at 44. By connecting this coil to a suitable battery 45, the unit may be magnetized with its ends north and south respectively.

From the foregoing description, it will be apparent that the present invention provides permanent magnets of novel construction, which are so arranged that they may readily be removed from a surface to which they have been applied; which are so arranged that by rolling movement the reluctance of the magnetic path between the magnetic device and the surface with which the device is associated may be increased, and the attractive forces decreased, to facilitate removal of the magnetic devices; which embody novel means for the protection of permanent magnets constructed of brittle material against becoming damaged during use; and which enable the utilization of permanent magnetic devices intsead of electromagnetic devices in the testing of metallic construction for defects.

Now, it is, of course, to be understood that although we have described in detail several embodiments of our invention, the invention is not to be thus limited, but only insofar as defined by the scope and spirit of the appended claim.

We claim as our invention:

A magnet construction comprising an elongated bar magnetized to define magnetic poles along two opposed major longitudinal faces of the bar, and protective pieces of non-magnetic material secured over the adjacent longitudinal faces of the bar, said pieces having curved edge margins defining surfaces adjacent the bar edge faces upon which the magnet may be rolled to remove the edge faces from contact with a surface to which the magnet has been applied.

ALFRED V. DE FOREST.
FOSTER B. DOANE.